INVENTORS
REGINALD THORNTON COE
LEONARD GRIFFITHS

ATTORNEY

2,968,740
MAGNETIC BRAKES

Reginald Thornton Coe, Rugby, and Leonard Griffiths, Coventry, England, assignors to The British Thomson-Houston Company Limited, a company of Great Britain Filed July 21, 1958, Ser. No. 749,830

Claims priority, application Great Britain Dec. 19, 1957

7 Claims. (Cl. 310—93)

The present invention relates to eddy current brakes in which a rotor non-rotatably mounted on a shaft to be braked is rotatable in a magnetic field which, on rotation of the rotor in the field, generates eddy currents in the rotor which provide a braking effect thereon.

The object of the invention is to provide a construction of such a brake which may be readily manufactured and is so constructed as to provide adequate ventilation, enabling the heat generated during a braking operation to be dissipated.

An eddy current brake according to the invention is provided with a rotor consisting of two pairs of spaced coaxial discs, the stator being constituted by two magnetic-field-producing members located between the faces of the respective pairs of discs, each of the magnetic-field-producing members having concentric poles which, when magnetised, are of opposite polarity and cause magnetic fluxes to enter and leave the pair of rotor discs with which it is associated whereby on rotation of the rotor discs to generate eddy currents therein, said members being provided with radial slots which provide salient poles and permit entry of cooling air into the space between the member and the adjacent rotor disc for passage to the space between the discs by way of apertures in the inner periphery of the rotor discs, one of the rotor discs in one pair being located in proximity to a rotor disc in the other pair, the inner faces of the proximate rotor discs being so shaped as, when rotated, to induce a current of air between them for cooling purposes. Each stator may be constituted from two annular rings having axially salient poles axially at each end thereof, the rings being coaxially located one within the other by means of axially spaced end plates which are secured together with the rings between them, the annular space between the rings containing the energising winding(s), the inner peripheries of the end plates are conveniently utilised to locate the bearings on which are mounted a shaft carrying the rotor discs. The outer peripheries of the end plates are used to support a housing enclosing the stator and parts of the rotor.

The shaft may be formed with an annular projection, against opposed shoulders of which the discs constituting the proximate pair are seated. The shaft may be constructed to provide annular tongues to which a rim on the inner periphery of each disc is secured by welding. The other discs of each pair may be non-rotatably secured to the shaft by splines.

Figure 1:
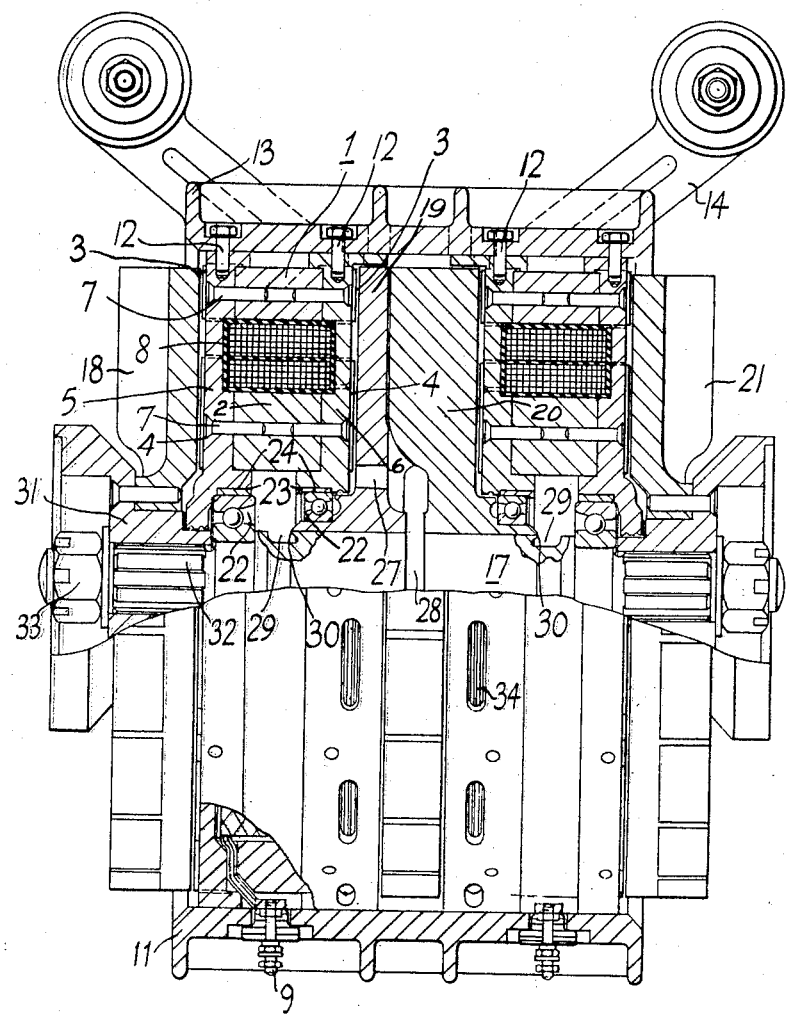
Figure 2:
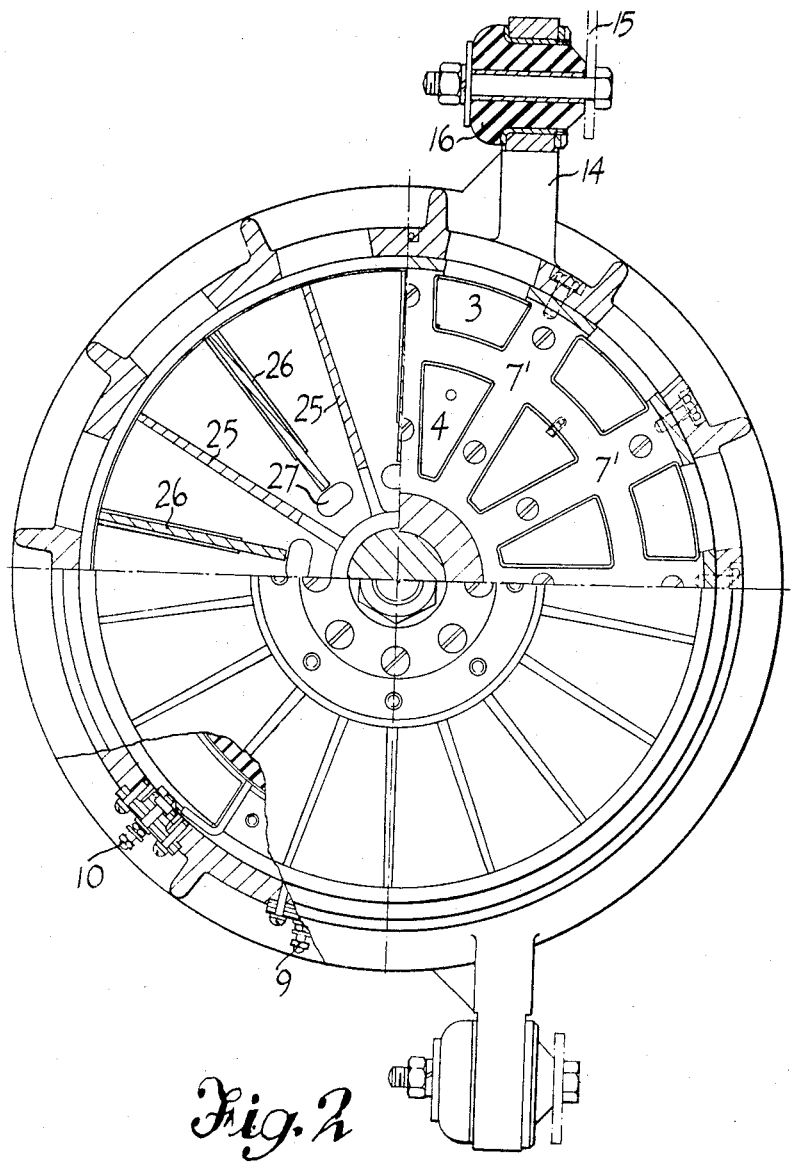

The invention will now be described with the aid of the accompanying drawings, in which Fig. 1 shows, partially in cross-section, an eddy current brake constructed in accordance with the invention, the section being taken in a plane containing the axis of the rotor, and Fig. 2 is an end view partially in cross-section of Fig. 1.

Referring to the drawings, the eddy current brake comprises a stator member constituted by two magnetic-field-producing members and a rotor rotatably mounted with reference to the stator. The magnetic-field-producing members are each of the same construction and are spaced apart axially of the shaft forming part of the rotor. Each magnetic-field-producing member consists of outer 1 and inner 2 annular rings of magnetic material, such as soft iron, having salient pole extensions 3, 4, respectively, extending axially from each end thereof. The annular rings are co-axially located one within the other by means of axially spaced end plates 5, 6 secured together by counter-sunk fixing screws 7. The salient poles are so shaped as to provide radial slots 7' between them, as shown in Fig. 2. The end plates are of non-magnetic material and may be in the form of aluminium castings of similar shape machined differently at their inner peripheries. In the annular space provided between rings 1, 2, is located excitation windings 8. In the arrangement shown, the excitation winding is constructed in two sections, insulated one from another and adapted to be connected individually to a source of energising voltage, according to the excitation required. One terminal of both sections of the excitation winding is earthed to the casing and the other ends are connected to terminals 9 and 10 (see Fig. 2), the terminals being mounted on an outer housing 11 which is secured to the end plates by means of set bolts 12. The housing is provided with ribs 13 which serve to protect the terminals 9, 10 from damage and increase the stiffness of the housing. The housing is shown as being provided with projecting ears 14 by which it can be secured to a stationary mounting 15 through the intermediary of a resilient bushing 16.

Within the stator is mounted a rotor member comprising a shaft 17 and the pairs of rotor discs 18, 19, and 20, 21, non-rotatably secured to the shaft. The shaft is mounted in bearings 22, shown as being in the form of ball bearings, each bearing being located within a recess 23 formed at the inner periphery of one of the end plates 5, 6. The recesses for the bearings may be lined with a steel or brass bush 24, cast integrally with the end plates.

With each of the magnetic-field-producing members is associated a pair of rotor discs, 18, 19 being associated with the left-hand magnetic-field producing member, and 20, 21 being associated with the right-hand member. The rotor discs 19, 20 of each pair are located in proximity to one another, the inner face of the rotor disc 19 being provided with radial ribs 25 which are inter-leaved with the corresponding ribs 26 on the proximate disc 20. The rotor discs 19, 20 are each provided adjacent their inner periphery with apertures 27 through which cooling air can enter the space between the rotor discs, the ribs of the rotor disc promoting an outward flow of air from between them. The apertures 27 lead from the interior of the magnetic-field-producing members.

Rotor discs 19, 20 are secured to the shaft 17 in the following manner: an annular projection 28 is formed on the shaft and provides opposed shoulders against which the discs 19, 20 are seated. The projection may be integral with, or in the form of a collar shrunk on the shaft. In order to secure the discs non-rotatably on the shaft, the shaft is provided with spaced annular recesses 29 each of which is constructed to provide an annular tongue 30 to which a rim on the inner periphery of the discs 19, 20 is secured by welding. The other, and outer one 18 of the pair of rotor discs 18, 19 associated with the left-hand magnetic-field-producing member is secured to shaft 17 through the intermediary of a coupling member 31, which is splined at 32 to the shaft 17, the coupling member 31 being held upon the shaft by a nut 33 screwed on to the end of the shaft. A similar means is adopted for securing the outer rotor disc 21 on shaft 17. The coupler members are coupled to adjacent ends of a shaft to be braked.

Cooling of the assembly is effected in the following manner: on rotation of the rotor relative to the stator a radially outward flow of air is produced by the ribs 25, 26 on the proximate discs 19, 20. This air is supplied by means of a radially inward flow through apertures 34 in the housing 11 which lead into the radial grooves 7' formed between the angularly separated salient poles 3, 4 on these members. The inwardly flowing air passes through the apertures 27 in the rotor discs 19, 20, to flow outwardly from the housing.

Whilst the construction illustrated has been shown as providing two pairs of rotor discs, each pair being associated with a single field producing member, it will be evident that, if desired, a further magnetic-field-producing member may be arranged axially along the shaft 17, the housing being extended to carry the additional magnetic-field-producing member with its associated pair of rotor discs. In this way a six-element construction will be obtained and which may even be extended to an eight-element construction should this prove necessary in order to achieve the desired power dissipation.

By reason of the flux produced by each magnetic-field-producing member passing across the two air gaps between the pair of rotor discs and the magnetic-field-producing member with which such pair is associated, the flux across the two air gaps is the same, and the possibility of an unbalance, or resultant, axial force on the rotor arising from inequality in the magnetic pulls excited by the members on the discs is minimised.

What we claim is:

1. An eddy current brake comprising a rotor consisting of two pairs of spaced co-axial discs, a stator constituted by two magnetic-field-producing members, said magnetic-field-producing members being located between the faces of the respective pairs of rotor discs, each of said magnetic-field-producing members having concentric poles which, when magnetised, are of opposite polarity and cause magnetic fluxes to enter and leave said pair of rotor discs with which it is associated whereby on rotation of the rotor discs to generate eddy currents therein, said magnetic-field-producing members being provided with radial slots which form salient poles and permit entry of cooling air into the space between said member and said rotor discs, adjacent thereto by way of apertures in the inner periphery of said rotor discs, one of said rotor discs in one of said pairs being located in proximity to a rotor disc in the other of said pairs, the inner faces of the proximate rotor discs being so shaped as, when rotated, to induce a current of air between them for cooling purposes and for cooling said magnetic-field-producing members by way of the apertures in the inner periphery of said rotor discs.

2. An eddy current brake as claimed in claim 1, in which each of said magnetic-field-producing members is constructed from two annular rings providing salient poles projecting axially from each end thereof, said rings being co-axially located one within the other by means of axially spaced end plates, said end plates being secured together with rings between them, the annular space between said rings containing the energising winding(s).

3. An eddy current brake as claimed in claim 2, in which the inner periphery of each of said end plates is utilised to locate a bearing, a shaft carrying said rotor discs being mounted on said bearings.

4. An eddy current brake as claimed in claim 3 in which the outer peripheries of the end plates are used to support a housing enclosing the stator and parts of the rotor.

5. An eddy current brake as claimed in claim 3 in which said shaft is formed to provide a collar having opposed shoulders, the discs forming said proximate pair being seated against said shoulders.

6. An eddy current brake as claimed in claim 3, in which said shaft is constructed to provide annular tongues, a rim on the inner periphery of said proximate pair of discs being secured by welding to said tongues.

7. An eddy current brake as claimed in claim 3 having coupling members non-rotatably and removably secured to the ends of said shaft, adjacent ends of a shaft to be braked being connectable to said coupling members, and the outermost one of each of said pair of discs being secured to said coupling members.

References Cited in the file of this patent
UNITED STATES PATENTS 2,487,551     Hugin _____ Nov. 8, 1949

FOREIGN PATENTS 1,094,894     France _____ Dec. 15, 1954